(12) United States Patent
Minami

(10) Patent No.: US 6,817,931 B2
(45) Date of Patent: Nov. 16, 2004

(54) END FACE POLISHING APPARATUS

(75) Inventor: Kouji Minami, Chiba (JP)

(73) Assignee: Seiko Instruments Inc., Chiba (JP)

( * ) Notice: Subject to any disclaimer, the term of this patent is extended or adjusted under 35 U.S.C. 154(b) by 37 days.

(21) Appl. No.: 10/199,822

(22) Filed: Jul. 19, 2002

(65) Prior Publication Data

US 2003/0060147 A1 Mar. 27, 2003

(30) Foreign Application Priority Data

Sep. 12, 2001 (JP) ........................................ 2001-276759

(51) Int. Cl.⁷ .............................. B24B 1/00; B24B 7/10
(52) U.S. Cl. ...................... 451/270; 451/66; 451/486; 451/42
(58) Field of Search ........................... 451/270, 66, 11, 451/282, 177, 370, 486, 42

(56) References Cited

U.S. PATENT DOCUMENTS

| | | | |
|---|---|---|---|
| 6,238,276 B1 * | 5/2001 | Miyazaki et al. | 451/266 |
| 6,361,418 B1 * | 3/2002 | Inada | 451/262 |
| 2002/0094766 A1 * | 7/2002 | Zuniga et al. | 451/287 |
| 2003/0045216 A1 * | 3/2003 | Arai et al. | 451/66 |
| 2003/0060147 A1 * | 3/2003 | Minami | 451/270 |

* cited by examiner

Primary Examiner—Lee D. Wilson
(74) Attorney, Agent, or Firm—Adams & Wilks

(57) ABSTRACT

An end face polishing apparatus has a lapping board mounted to undergo rotation and revolving movement, a lapping member having a polishing surface and disposed on the lapping board for rotation and revolving movement therewith, a polishing fixture for supporting a workpiece having an end face, and a pressing member. During a polishing operation, preselected portion thereof to bring the end face of the workpiece into pressure contact with the polishing surface of the lapping member and to dispose the preselected portion at a position closer to the polishing surface than to a center of gravity of the polishing fixture to thereby polish the end face of the workpiece during rotation and revolving movement of the lapping board.

20 Claims, 4 Drawing Sheets

END FACE POLISHING APPARATUS

BACKGROUND OF THE INVENTION

1. Field of the Invention

The present invention relates to an end face polishing apparatus that polishes an end face of a rod-shaped member such as fibers for optical communication and a ferrule holding fibers for optical communication.

2. Description of the Background Art

Fibers for optical communication are adhesively secured in the central hole of a ferrule, a main member of a connector, and then the ferrule end face and the end face of fibers are polished together and thus finished into a smooth, mirror surface. If the polished end faces of the ferrule and the fibers are not vertical to the central axis of the ferrule or if there is a flaw on the polished faces, the precision in positioning such ferrules as they are connected facing each other in an optical connector is lowered, and the loss increases. Therefore, the face of the ferrule including the optical fibers must be polished with high precision.

A conventional apparatus for polishing the end faces of optical fibers is disclosed for example by Japanese Patent Laid-Open No. 26456/1991. The disclosed end face polishing apparatus includes an eccentric adapter that rotates on a circle concentric with a rotating disc, and a planetary gear that transmits the rotation of a revolution motor to the eccentric adapter. These elements are coupled in a lapping board, so that the lapping board is allowed to rotate and revolve, while the end faces of a plurality of ferrules held by a polishing fixture are pressed against a lapping member secured to the lapping board by a supporting portion provided at the main body of the apparatus.

In the conventional end face polishing apparatus, however, the position for pressing the polishing fixture by the supporting portion and the position for polishing the rod-shaped member are different in height, so that a moment is applied upon the polishing fixture as the polishing fixture is pressed, and the operation becomes unstable. The end face of the bar-shape member is therefore polished into a curved surface, and when a ferrule is used as the rod-shaped member, the polishing precision of the ferrule could be low. As a result, when end faces are connected in abutment with each other in optical connection, optical insertion loss could be large.

In a multi-fiber optical connector as a ferrule holding a plurality of optical fibers, the curved surface resulting from using the conventional end face polishing apparatus could increase insertion loss caused by optical connection of optical fibers particularly on the outer periphery when end faces of the multi-fiber optical connectors are abutted against each other.

Furthermore, in the conventional end face polishing apparatus, the polishing fixture should be secured free from inclination in order to polish the end face not to be curved, while the precision of securing the polishing fixture and the precision of attaching the rod-shaped member to the polishing fixture must be high, which requires much time and complicated operation.

SUMMARY OF THE INVENTION

The present invention overcomes the foregoing disadvantages in the conventional art, and it is an object of the present invention to provide an end face polishing apparatus that allows a rod-shaped member to be polished with improved precision and the polishing process to be simplified.

According to a first aspect of the present invention directed to a solution to the above disadvantages, in an end face polishing apparatus polishing an end face of a rod-shaped member mounted at a polishing fixture by pressing the rod-shaped member against a lapping member on a lapping board supported at the main body of the apparatus to rotate and rock, the polishing fixture is pressed through an abutting part against a supporting portion provided at the apparatus main body, and the abutting part is located more on the side of the lapping board than the center of gravity of the polishing fixture.

According to a second aspect of the invention, in the end face polishing apparatus according to the first aspect, the abutting part is within the range of ±5.0 mm from the polishing surface of the lapping member in the pressing direction.

According to a third aspect of the invention, in the end face polishing apparatus according to the first or second aspect, the abutting part is located about in the center of the polishing fixture. Here, the abutting part may be provided in at least two, preferably at least four positions at the outer periphery of the jig, and still the same effect can be provided According to a fourth aspect of the invention, in the end face polishing apparatus according to any one of the first to third aspects, a recessed portion is provided near the center of the lapping board on the side of the polishing fixture, and the abutting part of the polishing fixture against the supporting portion is provided to project into the recessed portion.

According to a fifth aspect of the invention, in the end face polishing apparatus according to any one of the first to fourth aspects, the rod-shaped member is a ferrule including a ferrule tubular body for holding optical fibers and a collar member provided at a rear end of the ferrule tubular body for holding coated optical fibers.

According to a sixth aspect of the invention, in the end face polishing apparatus according to the fifth aspect, the ferrule is a multi-fiber optical connector.

According to a seventh aspect of the invention, an end face polishing method includes pressing an end face of a rod-shaped member against a surface of a rotating and revolving lapping member, and securing the rod-shaped member by an abutting part extended in the radial direction of the rod-shaped member and about in the same level as the surface of the lapping member.

According to an eighth aspect of the invention, a polishing fixture has a through hole for receiving a rod-shaped member in the center, an abutting part at the outer periphery for pressing from the upper surface to the bottom surface, and a recessed portion at the bottom surface in the center.

According to a ninth aspect of the invention, a method of polishing an end face of a rod-shaped member includes the steps of securing a polishing fixture having a through hole for receiving a rod-shaped member in the center, an abutting part at the outer periphery for pressing from the upper surface to the bottom surface, and a recessed portion at the bottom surface in the center, providing the upper surface of a lapping member facing the bottom surface in the center about in the same level as the upper surface of the polishing fixture, and rotating and revolving the lapping member.

According to the present invention, the abutting part where the polishing fixture is pressed by the supporting portion is located below the center of gravity of the polishing fixture, and therefore the moment applied on the polishing fixture can be reduced. In this way, the periphery of the polishing fixture can be prevented from being deviated from the lapping board in the vertical direction, and the polishing surface of the rod-shaped member can be polished perpendicularly to the axial direction.

DESCRIPTION OF THE PREFERRED EMBODIMENTS

Embodiments of the present invention will now be described in detail in conjunction with the accompanying drawings.

First Embodiment

Figure 1:
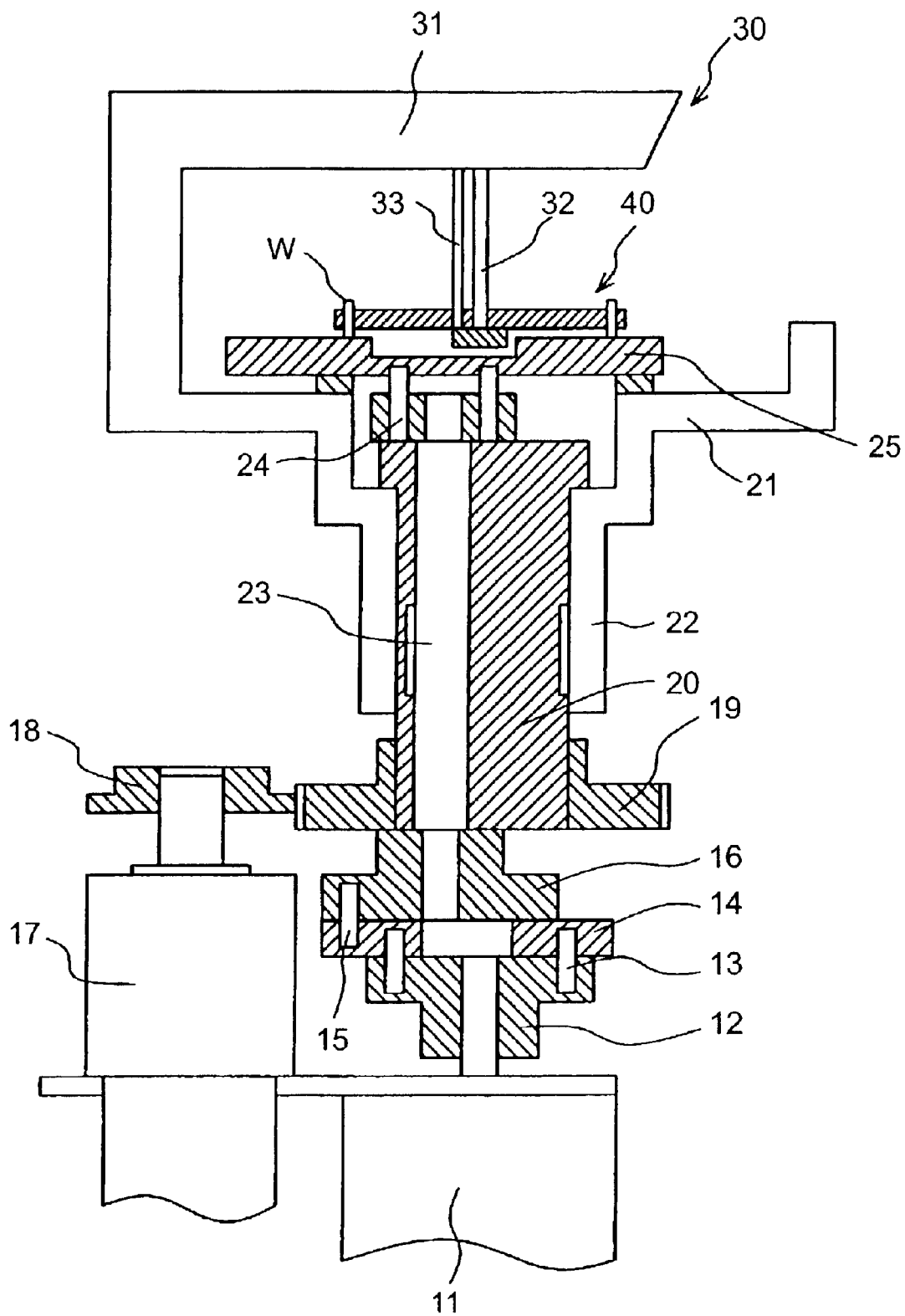
FIG. 1 is a sectional view of a part of an end face polishing apparatus according to a first embodiment of the invention.

FIG. 1 is a schematic sectional view of an end face polishing apparatus according to a first embodiment of the present invention.

As shown in FIG. 1, the central part of a first rotation transmission plate 12 is rigidly coupled to the rotation shaft of a rotation motor 11. A plurality of first coupling pins 13 are secured to the first rotation transmission plate 12 concentrically around the rotation center of the first rotation transmission plate 12. The first coupling pins 13 are each rotatably coupled to an eccentric part of a corresponding one of rotation transmission plates 14. Second coupling pins 15 are each secured at an eccentric part of a corresponding one of the rotation transmission plates 14. The second coupling pins 15 are rotatably coupled to a second rotation transmission plate 16.

Meanwhile, the central part of a driving gear 18 is rigidly coupled to the rotation shaft of a revolution motor 17 and the driving gear 18 is engaged with a driven near 19. The driven near 19 is rigidly coupled to the lower periphery of a revolution transmission shaft 20, the upper periphery of which is engaged with the bearing tube 22 of an apparatus main body 21. A rotation shaft 23 is rotatably fitted in a position a prescribed distance deviated from the center of the revolution transmission shaft 20, and the lower end of the rotation shaft 23 is rigidly coupled to the rotation center of the second rotation transmission plate 16.

The rotation shaft 23 has its upper end coupled to a polishing member or lapping board 25 through a coupling member 24. On the upper surface of the lapping board 25, a lapping member which is not shown is provided.

Meanwhile, at the apparatus main body 21, a jig board or polishing fixture 40 having a plurality of workpieces in the form of rod-shaped members W such as ferrules secured thereto is supported by a supporting mechansim 30.

The supporting mechanism 30 and the polishing fixture 40 will now be detailed.

Figure 2A:
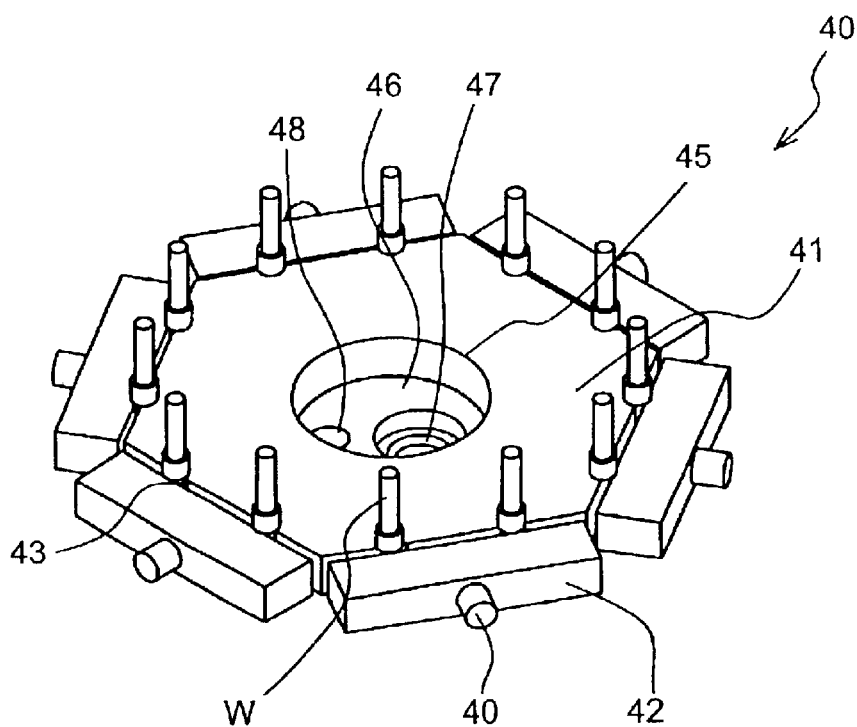
FIG. 2A is a perspective view of a polishing fixture and a supporting mechanism according to the first embodiment.
Figure 2B:
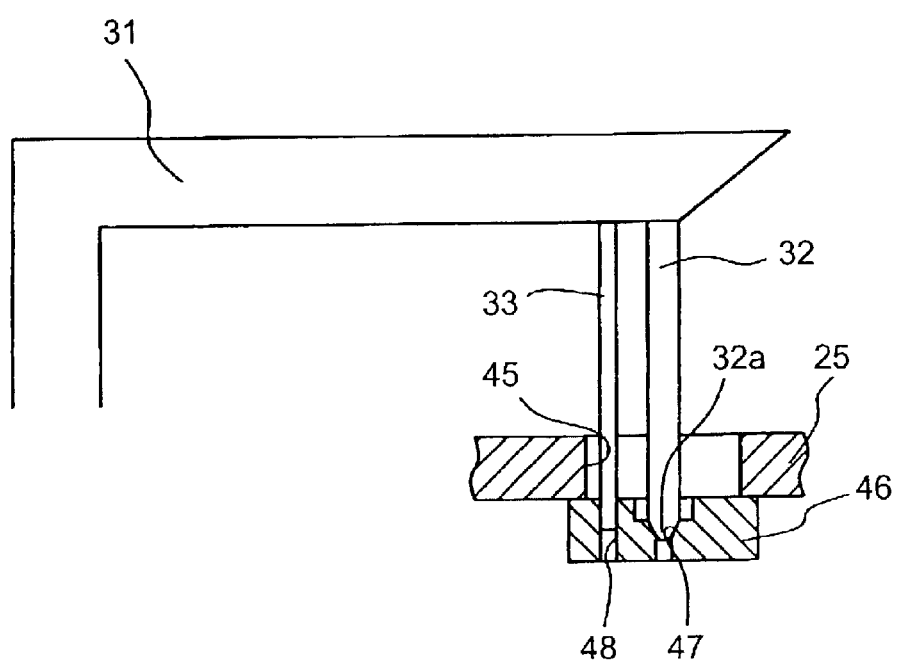
FIG. 2B is a sectional view of a main part of the polishing fixture and the supporting mechanism.
Figure 3A:
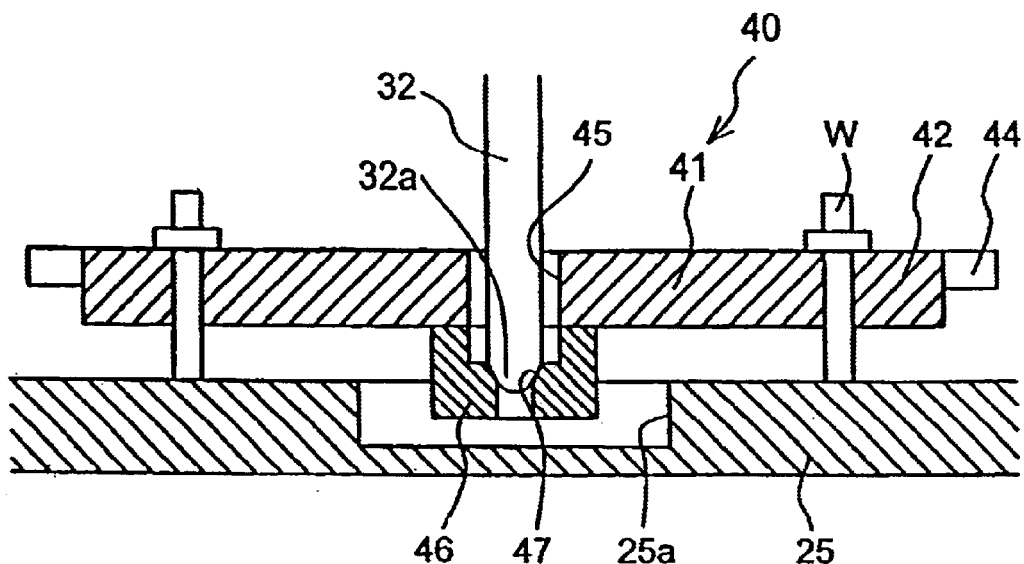
FIG. 3A is a sectional view of a main part of a polishing fixture and a lapping board according to the invention.

FIG. 2A is a perspective view of the polishing fixture, FIG. 2B is a sectional view of a main part of the polishing fixture and the supporting mechanism, and FIG. 3A is a sectional view of the polishing fixture and the supporting mechanism.

As shown in FIGS. 2A to 3A, the polishing fixture 40 includes a polishing fixture main body 41 and a plurality of fittings 42 attached at a side surface of the polishing fixture main body 41.

The polishing fixture main body 41 has a polygonal shape, each side of which has V grooves 43 in the thickness-wise direction.

In a position of the polishing fixture main body 41 facing the V groove 43, the fitting 42 is secured through a securing screw 44. The rod-shaped member W is held between the V groove 43 and the fitting 42, so that the rod-shaped member W is detachably secured to the polishing fixture 40.

Note that according to the embodiment, two such V grooves 43 are provided at each side, so that twelve rod-shaped members W altogether can be secured for the polishing fixture main body 41 in a hexagon shape. The type of the rod-shaped member W is not specifically limited and may be a cylindrical rod-shaped member such as a ferrule, or a rod-shaped member having a rectangular section such as a multi-fiber ferrule or a multi-fiber optical connector. According to the embodiment, a cylindrical ferrule is used as the rod-shaped member W. The fitting 42 and the securing screw 44 used to secure the rod-shaped member W to the polishing fixture main body 41 are not limited to those described.

About in the center of the polishing fixture main body 41, there is a through hole 45 penetrating in the thickness-wise direction. A tubular member in the form of a boss 46 abutted and pressed against the polishing fixture main body 41 is secured at the opening of the through hole 45 on the side of lapping board 25, in other words at the polishing fixture main body 41 on the side of the lapping board 25. As will be detailed, at the upper surface of the boss 46 on the side of the through hole 45, there are a tapered recessed portion 47 against which the tip end of pressing member or portion 32 of the supporting mechanism 30 abuts about in the same level as the polishing surface of the rod-shaped member W in abutment against the lapping board, and a restriction hole 48 to which a restriction pin 33 to restrict the movement in the rotation direction is engaged.

According to the embodiment, in order to provide the polishing surface of the lapping board 25 and the recessed portion 47 of the polishing fixture 40 about in the same level, a recessed portion 25a is provided about in the center of the lapping board 25 so that the boss 46 projecting from the polishing fixture 40 does not abut against the lapping board 25.

Meanwhile, the supporting mechanism 30 includes a supporting arm 31 provided at the apparatus main body 21, the pressing portion 32 supported by the supporting arm 31 as it is urged to press the polishing fixture 40 toward the lapping board 25, and the restriction pin 33 provided at the supporting arm 31 to restrict the movement of the polishing fixture 40 in the rotation direction.

The pressing portion 32 is held as it is urged toward the lapping board 25 by urging means (not shown) which is provided at the supporting arm 31. A tapered portion 32a provided at the tip end of the pressing portion abuts against the recessed portion 47 of the boss 46 at the polishing fixture 40, so that the polishing fixture 40 is pressed toward the lapping board 25.

According to the embodiment, the abutting part between the tapered portion 32a of the pressing portion 32 and the recessed portion 47 of the boss 46 constitutes a preselected portion of the polishing fixture 40 and is provided about in the same level as the end face of the rod-shaped member W to be polished by the lapping board 25. The height of the abutting part should be more on the side of the lapping board 25 than the center of gravity of the polishing fixture 40 as will be described.

Meanwhile, the restriction pin 33 is engaged with the restriction hole 48 of the boss 46 at the polishing fixture 40, so that the movement of the polishing fixture 40 is restricted as the lapping board 25 rotates in the rotation direction.

More specifically, the polishing fixture 40 is urged by the pressing portion 32 toward the lapping board 25 as its movement in the rotation direction is restricted by the restriction pin 33 of the supporting mechanism 30. Thus, the polishing fixture 40 is supported on the lapping board 25 through the tip ends of the rod-shaped members W secured by the fitting 42. The lapping board 25 is rotated and rocked to polish the tip end faces of the rod-shaped members W.

Figure 3B:
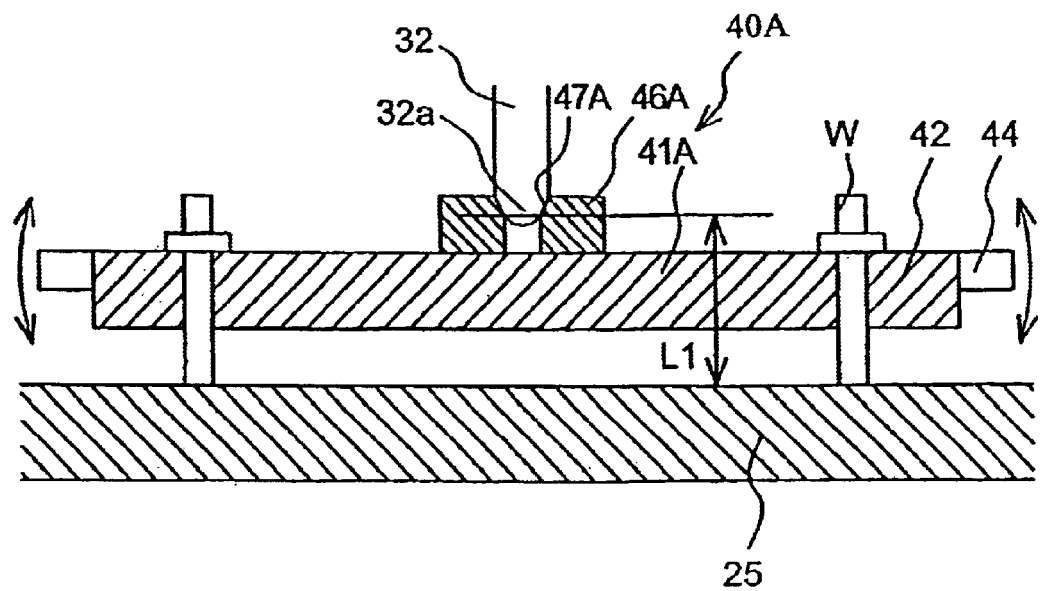
FIG. 3B is a sectional view of a main part of a conventional polishing fixture and a conventional lapping board.

Here, the state of the polishing fixture at the time of polishing will be described in comparison between the conventional end face polishing apparatus and the end face polishing apparatus according to the embodiment in conjunction with FIGS. 3A and 3B. FIG. 3B is a sectional view of a main part of the conventional end face polishing apparatus.

As shown in FIG. 3B, a conventional polishing fixture 40A is provided with a boss 46A at the upper surface of the polishing fixture main body 41A, and the tapered portion 32a of the pressing portion 32 abuts against the upper part of the boss 46A. More specifically, in the conventional end face polishing apparatus, the abutting part where the polishing fixture 40A is pressed against the pressing portion 32 is more on the side of the pressing portion 32 than the center of gravity of the polishing fixture 40A.

In the polishing fixture 40A, a load is applied on the recessed portion 47A a distance L1 apart from the polishing surface, i.e., from the reference point at which the end face of the rod-shaped member W abuts against the lapping board 25. Therefore, when the lapping board 25 is rotated and rocked, the polishing fixture 40A has its circumferential edge deviated up and down and is not operated stably, so that the polishing surface of the rod-shaped member W is finished into a curve.

Meanwhile, as shown in FIG. 3A, in the end face polishing apparatus according to the embodiment, the boss 46 is provided at the bottom of the polishing fixture main body 41, and the tapered portion 32a of the pressing portion 32 is abutted against the upper part of the boss 46. Therefore, the abutting part where the polishing fixture 40 is pressed against the pressing portion 32 is about in the same level as that of the surface of the rod-shaped member W polished by the lapping board 25.

More specifically, in the polishing fixture 40 according to the embodiment, the distance from the polishing surface as a reference to the recessed portion 47 is zero, and therefore when the lapping board 25 is rotated and rocked to polish the rod-shaped member W, the periphery of the polishing fixture 40 is not deviated up and down, and the end face of the rod-shaped member W can be polished into a surface perpendicular to the axial direction with high precision.

Therefore, the abutting part where the polishing fixture 40 is pressed against the supporting mechanism 30 is in a position whose distance from the polishing surface as a reference where the end face of the rod-shaped member W is abutted against the lapping board 25 is as small as possible i.e. is more on the side of the lapping board 25 than the center of gravity of the polishing fixture 40. In this way, the deviation of the periphery of the polishing fixture 40 can be reduced.

The abutting part is preferably positioned about in the same level as the polishing surface, while as long as the abutting part is positioned in the range of ±5.0 mm in the pressing direction of the polishing fixture 40 from the polishing surface as a reference, the effect is similarly remarkable as when they are positioned about in the same level.

In this way, the abutting part where the polishing fixture 40 is pressed against the supporting mechanism 30 is provided more on the side of the lapping board 25 than the center of gravity of the polishing fixture 40, so that the periphery of the polishing fixture 40 can be prevented from being deviated in the vertical direction from the lapping board 25. Thus, the end face of the rod-shaped member W can be polished into the surface vertical to the axial direction with high precision. When a ferrule is used for the rod-shaped member W, the insertion loss by optical connection can be reduced. Since the lapping board does not have to be secured to prevent the vertical deviation, the structure of the end face polishing apparatus can be simplified. Since positioning with high precision is not necessary, the polishing process can be simplified as well.

In the above description, the center of the polishing fixture is pressed, while the polishing fixture may be pressed in at least two positions in the outer periphery, so that the moment of the polishing fixture can be reduced and the polishing surface of the rod-shaped member can be formed into a smooth surface perpendicular to the axis of the rod-shaped member with no chamfer or waviness.

The operation of the end face polishing apparatus according to the embodiment will now be described. As shown in FIG. 1, for the revolution, the revolution motor 17 is driven to rotate the revolution transmission shaft 20 through the gears 18 and 19, and the lapping board 25 revolves by a prescribed amount of eccentricity. In this case, the rotation shaft 23 is located in the revolution transmission shaft 20, while a plurality of rotation transmission plates 14 are provided in the space between the rotation shaft 23 and the first rotation transmission plate 12. The rotation transmission plates 14 rotate around the first coupling pins 13 in the same rotation phase as the revolution transmission shaft 20. Therefore, regardless of whether the first rotation transmission plate 12 is stationary or rotates, the rotation of the revolution transmission shaft 20 is not restricted.

Meanwhile, for the rotation, the rotation motor 11 is driven to rotate the first rotation transmission plate 12, while the first coupling pins 13 are located concentrically with the first rotation transmission plate 12, and therefore move in the same trajectory as the above. The rotation shaft 23 is deviated by a prescribed distance from the center, while the shaft is coupled through the rotation transmission plates 14, and therefore the rotation at the same number of revolutions as that of the first rotation transmission plate 12 is transmitted to the rotation shaft 23.

Thus, the lapping board 25 revolves as it rotates by the rotation of the revolution transmission shaft 20 and the rotation shaft 23.

Meanwhile, with respect to the lapping member provided at the lapping board 25, the polishing fixture 40 has its movement in the rotation direction restricted by the restriction pin 33 of the supporting mechanism 30, and as the polishing fixture is urged toward the lapping board 25 by the pressing portion 32, the end face of the rod-shaped member W is pressed onto the lapping board 25. In this way, the tip end of the rod-shaped member W is polished.

Second Embodiment

Figure 4:
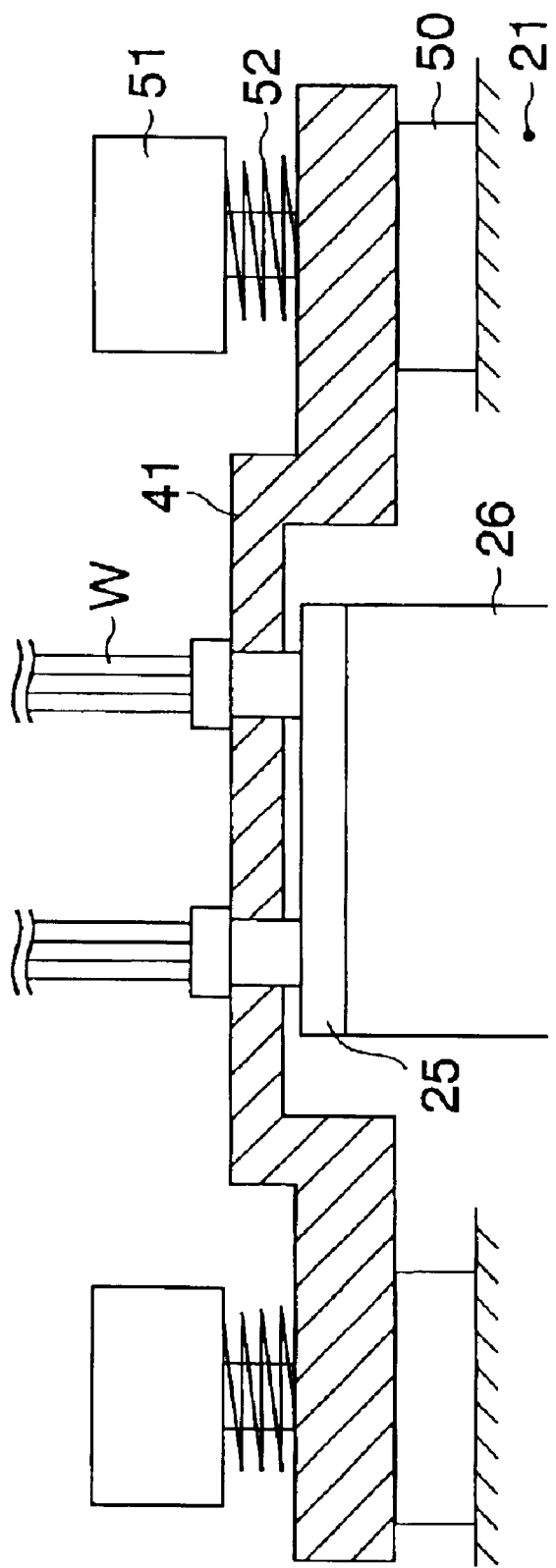
FIG. 4 is a sectional view of a part of the end face polishing apparatus according to the first embodiment.

FIG. 4 is a sectional view of another embodiment of the present invention. A multi-fiber optical connector as a rod-shaped member W is perpendicularly secured to the polishing fixture main body 41, and both ends of the polishing fixture main body 41 are secured by screws 51 as they are pressed downward using a spring 52. The bottom surface of the polishing fixture main body is secured to the upper surface of the apparatus main body 21 through a spacer 50. An end face of the rod-shaped member W is in contact with the surface of the lapping board 25, so that the lapping board 25 is rotated by the rotation shaft 26 and the end face of the rod-shaped member W can be polished. The lapping board 25 rotates as it revolves.

The surface of the lapping board 25 is about in the same level as the upper surface of the outer periphery of the polishing fixture main body. As a result, the moment applied on the polishing fixture is reduced, and the deviation of the rod-shaped member W in the radial direction is reduced. The end face of the rod-shaped member W is polished into a smooth surface in the direction normal to the axis of the rod-shaped member with no waviness or distortion.

Other Embodiments

The basic structure of the end face polishing apparatus according to the present invention is not limited to those of the embodiments described above.

In the above description of the first embodiment, the polishing fixture 40 holds a cylindrical ferrule as the rod-shaped member W, while the member is not limited to this and may for example be a multi-fiber optical connector or an optical connector holding a ferrule.

The end face polishing apparatus according to the present invention can polish the end surface of the rod-shaped member W perpendicularly to the axial direction, and therefore insertion loss at the time of optical connection can surely be reduced particularly when a multi-fiber optical connector is polished.

In the above description of the first embodiment, there is a single abutting part between the recessed portion 47 of the boss 46 at the polishing fixture 40 and the tapered portion 32a of the pressing portion 32, while there may be a plurality of abutting parts instead. Such a plurality of abutting parts should be provided to allow the polishing fixture 40 to be uniformly pressed.

Furthermore, in the above description of the end face polishing apparatus according to the first embodiment, the driving system is provided with the rotation shaft 23 in a position a prescribed distance deviated from the center in the revolution transmission shaft 20, while the end face polishing apparatus may have a driving system provided with a revolution transmission shaft within a rotation shaft. The driving system for the end face polishing apparatus is not particularly limited.

In the foregoing, construction of the end face polishing apparatus according to the present invention, the abutting part of the polishing fixture to be pressed by the pressing portion is positioned below the center of gravity of the polishing fixture, and the moment applied upon the polishing fixture is reduced, so that the periphery of the polishing fixture can be prevented from being deviated from the lapping board in the vertical direction. Thus, the surface of the rod-shaped member can be polished perpendicularly to the axial direction. Neither a device to secure the polishing fixture nor positioning with high precision is necessary and, therefore, the polishing process can be simplified.

What is claimed is:

1. An end face polishing apparatus comprising:
   a lapping board mounted to undergo rotation and revolving movement;
   a lapping member disposed on the lapping board for rotation and revolving movement therewith, the lapping member having a polishing surface;
   a polishing fixture for supporting a rod-shaped member having an end face; and
   a pressing member for pressing the polishing fixture at a preselected portion thereof to bring the end face of the rod-shaped member into pressure contact with the polishing surface of the lapping member and to dispose the preselected portion at a position closer to the polishing surface than to a center of gravity of the polishing fixture to thereby polish the end face of the rod-shaped member during rotation and revolving movement of the lapping board.

2. An end face polishing apparatus according to claim 1; wherein the preselected portion of the polishing fixture is disposed within a range of ±5.0 mm from the polishing surface of the lapping member during a polishing operation.

3. An end face polishing apparatus according to claim 1; wherein the polishing fixture has a main body; and wherein the preselected portion of the polishing fixture is disposed proximate a center of the main body of the polishing fixture.

4. An end face polishing apparatus according to claim 1; wherein the preselected portion of the polishing fixture is disposed at an outer periphery of the polishing fixture.

5. An end face polishing apparatus according to claim 1; wherein the lapping board has a generally central recessed portion into which the preselected portion of the polishing fixture projects during a polishing operation.

6. An end face polishing apparatus according to claim 1; wherein the rod-shaped member comprises a ferrule having a tubular body for holding at least one optical fiber.

7. An end face polishing apparatus according to claim 6; wherein the ferrule comprises a multi-fiber optical connector.

8. An end face polishing method, comprising the steps of:
   providing a lapping member having a polishing surface and mounted to undergo rotation and revolving movement;
   providing a polishing fixture supporting a rod-shaped member having an end face; and
   pressing the polishing fixture at a preselected portion thereof to bring the end face of the rod-shaped member into pressure contact with the polishing surface of the lapping member and to dispose the preselected portion of the polishing fixture substantially on a plane extending along the polishing surface of the lapping member to thereby polish the end face of the rod-shaped member during rotation and revolving movement of the lapping member.

9. A polishing fixture comprising: a main body having a first main surface, a second main surface opposite the first main surface, and at least one through-hole extending from the first main surface to the second main surface for supporting a rod-shaped member, the first main surface having a central recessed portion communicating with the through-hole, and the second main surface having a central surface portion through which the through-hole extends and a pressing surface portion extending from the central surface portion to a periphery of the second main surface for receiving a pressing force.

10. An end face polishing method according to claim 9; wherein the rod-shaped member comprises a multi-fiber optical connector.

11. A method of polishing an end face of a rod-shaped member, comprising the steps of:

provviding a polishing fixture having a first main surface, a second main surface opposite the first main surface, and at least one through-hole supporting a rod-shaped member and extending from the first main surface to the second main surface, the first main surface having a central recessed portion communicating with the through-hole so that an end face of the rod-shaped member extends into the central recessed portion, and the second main surface having a central surface portion through which the through-hole extends and a pressing surface portion extending from the central surface portion to a periphery of the second main surface; providing a lapping member having a polishing surface and mounted to undergo rotation and revolving movement; positioning the lapping member so that the polishing surface confronts the end face of the rod-shaped member and is disposed substantially on a plane extending along the pressing surface portion of the polishing fixture; and pressing the pressing surface portion of the polishing fixture to bring the end face of the rod-shaped member into pressure contact with the polishing surface of the lapping member to thereby polish the end face of the rod-shaped member during rotation and revolving movement of the lapping member.

12. An end face polishing apparatus comprising:

a rotational shaft mounted for undergoing rotation about a first axis and for undergoing revolving movement about a second axis offset from the first axis;

a polishing member having a polishing surface and being connected to the rotational shaft for rotation and revolving movement therewith during a polishing operation;

a jig board for supporting at least one workpiece having an end face; and pressing means for pressing the jig board at a preselected portion thereof to bring the end face of the workpiece into pressure contact with the polishing surface of the polishing member and to dispose the preselected portion of the jig board at a position closer to the polishing surface than to a center of gravity of the jig board to thereby polish the end face of the workpiece during rotation and revolving movement of the rotational shaft.

13. An end face polishing apparatus according to claim 12; wherein at the position closer to the polishing surface than to a center of gravity of the jib board, the preselected portion is disposed substantially on a plane extending along the polishing surface of the polishing member.

14. An end face polishing apparatus according to claim 12; wherein the preselected portion of the jig board comprises a concave portion; and wherein the pressing means comprises a pressing member having a convex portion disposed in the concave portion of the jig board.

15. An end face polishing apparatus according to claim 12; wherein the jig board has a first main surface and a second main surface opposite the first main surface, the second main surface confronting the polishing surface of the polishing member during a polishing operation; further comprising a tubular member integrally connected to the jig board and projecting from the second main surface thereof, the tubular member having the preselected portion of the jig board.

16. An end face polishing apparatus according to claim 15; wherein the polishing member has a recessed portion into which the tubular member projects during a polishing operation.

17. An end face polishing apparatus according to claim 15; wherein the jig board has a through-hole extending from the first main surface to the second main surface; and wherein the pressing means comprises a pressing member having a pressing portion extending through the through-hole and into the tubular member for pressing the preselected portion of the jig board.

18. An end face polishing apparatus according to claim 17; wherein the polishing member has a recessed portion into which the tubular member projects during a polishing operation.

19. An end face polishing apparatus comprising:

a rotational shaft mounted for undergoing rotation about a first axis and for undergoing revolving movement about a second axis offset from the first axis;

a polishing member having a polishing surface and being connected to the rotational shaft for rotation and revolving movement therewith during a polishing operation;

a jig board for supporting at least one workpiece having an end face, the jig board having a first main surface, a second main surface opposite the first main surface, and at least one through-hole extending from the first main surface to the second main surface for supporting the workpiece, the first main surface having a central recessed portion communicating with the through-hole, and the second main surface having a central surface portion through which the through-hole extends and a pressing surface portion extending from the central surface portion to a periphery of the second main surface; and pressing means for pressing the jig board at the pressing surface portion thereof during a polishing operation to bring the end face of the workpiece into pressure contact with the polishing surface of the polishing member.

20. An end face polishing apparatus according to claim 19; wherein during the polishing operation, the preselected portion is disposed substantially on a plane extending along the polishing surface of the polishing member.

* * * * *